Patented June 26, 1923.

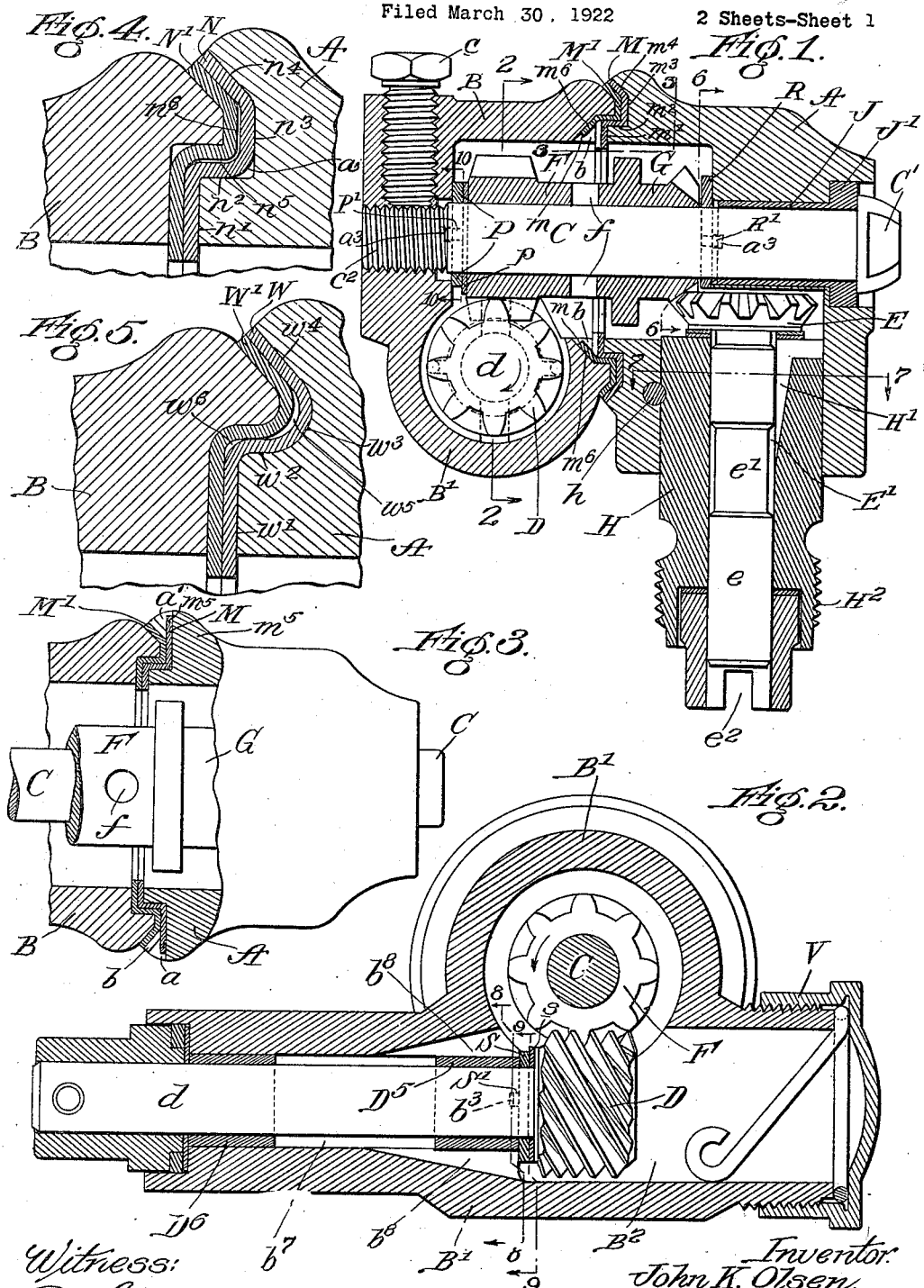

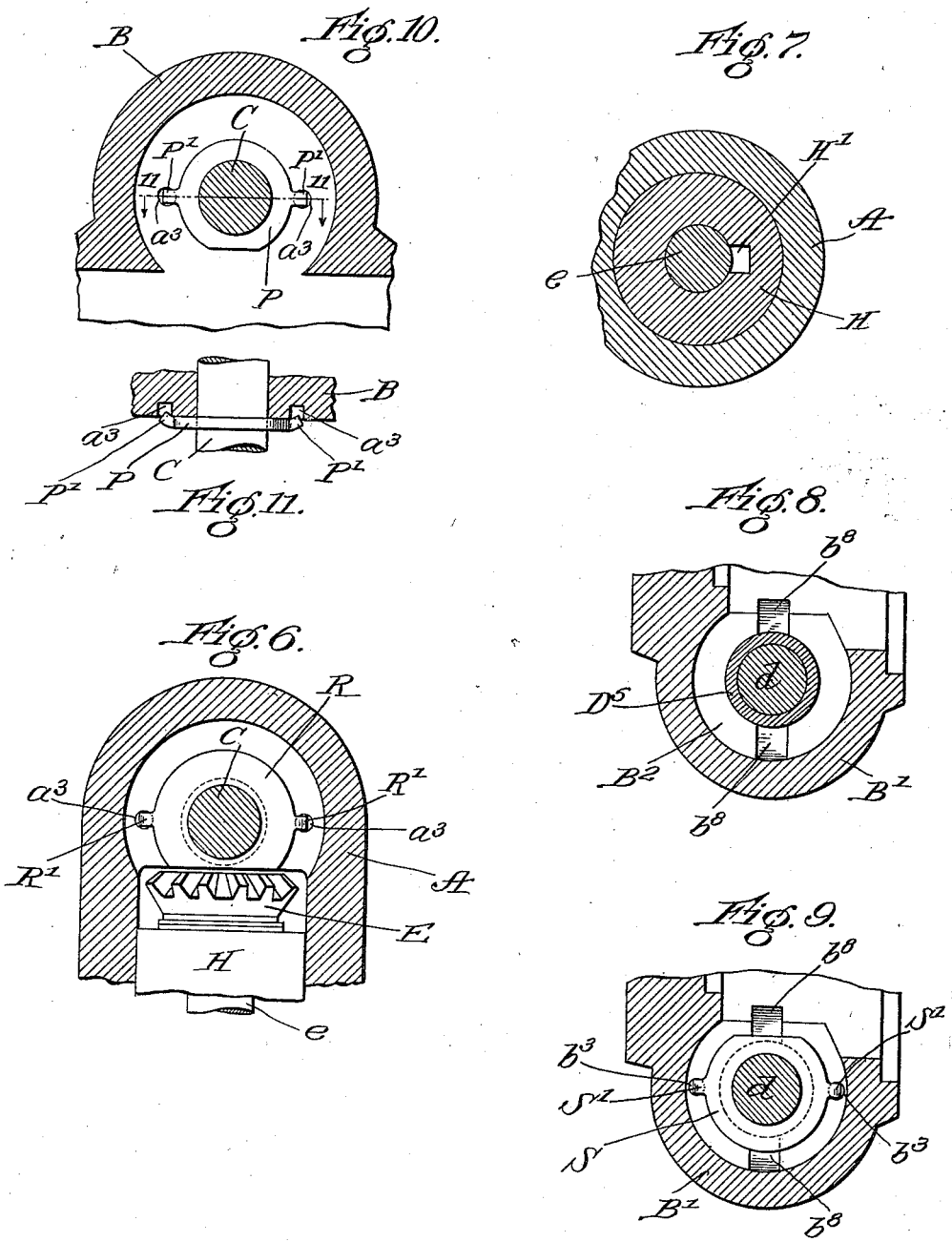

1,459,958

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

SWIVEL-GEAR JOINT AND HOUSING.

Application filed March 30, 1922. Serial No. 548,238.

*To all whom it may concern:*

Be it known that I, JOHN K. OLSEN, a citizen of the United States, having residence in the city of Chicago, in the county of Cook and State of Illinois, have invented certain new and useful Improvements in Swivel-Gear Joints and Housings, of which the following is a specification, reference being had to the accompanying drawings, forming a part thereof.

The purpose of this invention is to provide an improved construction of a swivel gear joint housing, a train of four gears and an inleading driving and outleading driven shaft. It consists in the details of construction shown and described for permitting the use of supplemental die castings and providing a suitable hard metal for wearing faces and journal bearings and for providing for the access of grease contained in the housing to all the bearings, and for other detail betterments above the devices of this type commonly in use, all as shown and described and as indicated in the claims.

In the drawings:

Figure 1 is a section axial with respect to the outleading or driven shaft and the pivot journal bolt of a device embodying this invention.

Figure 2 is a section at the line 2—2 on Figure 1.

Figure 3 is a detail sectional elevation of a part of one member of the joint, section being made at the line 3—3 on Figure 1.

Figures 4 and 5 are fragmentary detail sections radial with respect to the pivot journal bolt for showing modifications in the form of the wearing washers between the two housing members.

Figure 6 is a section at the line 6—6 on Figure 1.

Figure 7 is a section at the line 7—7 on Figure 1.

Figure 8 is a section at the line 8—8 on Figure 2.

Figure 9 is a section at the line 9—9 on Figure 2.

Figure 10 is a section at the line 10—10 on Figure 1.

Figure 11 is a section at the line 11—11 on Figure 10.

The structure shown in the drawings comprises two gear housing members, A and B, each having a gear and three cavities, said cavities opening at one side of said members, at which said housing members are seated upon each other for the swivel action for which the device is intended. In each member there is journaled a shaft, being a driving shaft in one member and a driven shaft in the other, said shafts having upon their inner ends driving and driven gears respectively, for meshing with driven and driving gears in the respective members, coaxial with each other,—and as shown, integral,—said coaxial integral gears being journaled upon a pivot journal bolt by which the two housing members are secured together for swiveling upon each other at their faces at which they are seated, as above stated. The general construction thus far described is a familiar one for the purpose. The characteristics of the present invention are details of construction for making it possible to employ—and facilitate the employment of—relatively soft metal die castings for the two housing members, and providing hard metal journal bearings and wearing surfaces at all the points at which wearing movement may occur in the operation of the device. And incidentally to this general purpose, and supplemental thereto, the invention is characterized by provision for insuring free circulation of the lubricant throughout the entire connected and associated cavities in which there are parts requiring lubrication.

A and B are the two housing members having grease and gear cavities, $a$ and $b$, open at the side of said members, respectively at which they seat upon each other and where they are provided with hard metal wearing plates or washers, M and $M^1$,—referring to the construction shown in Fig. 1,—the same being shown in modified form, designated N and $N^1$, and W, $W^1$, in Figures 4 and 5, respectively. The housing member, A, has journaled in it the driven shaft, $e$, which carries the pinion, E. The housing member, B, has journaled in it the driving shaft, $d$, carrying at its inner end the pinion, D. The two housing members are secured and pivoted together by the journal bolt, C, which penetrates them at and at right angles to their meeting plane, a member, A, having a steel bushing, J, provided with a heavy flange head, $J^1$, for seating the bolt, C, and stopping it longitudinally by its head, $C^1$. The other end of the bolt is screw-threaded as seen at $C^2$, and screwed into the opposite wall of the housing member, B. A set screw, $c$, being provided for securing the bolt, C, against turning after it is properly set for holding the two housing members, A and B, snugly but rotatably together. It will be understood that the bushing, J, is provided to afford a wearing bearing for the swiveling action of the housing member, A, as it turns with respect to the housing member, B, about the bolt which is fixed in the latter member. On the bolt, C, there are journaled gears, F and G, preferably as shown, integral with each other, the gear, F, meshing with and being driven by the gear, D, and the gear, G, meshing with and driving the gear, E. The direction of rotation, as indicated by the arrows on Figures 1 and 2, causes the thrust of the shaft, $d$, to be outward and the gears, D and E, being direct bevel gears, the thrust of the shaft, $e$, is also outward, without regard to the direction of rotation. In general, the thrust of the unitary gear members, F, G, is toward the head of the swivel bolt, C; but the reaction to the resistance of the driven gear and shaft to the driving action is liable to distribute the thrust of this shaft more or less equally in both directions. In view of these thrusts, wearing washers are provided on the several shafts to take the thrust, said wearing washers being engaged non-rotatably with the die casting housing members where they seat thereon so that no wear of rotation shall be imposed upon the soft metal die castings. The same precaution is employed with respect to the wearing of washers or facings, M and $M^1$, interposed between the two housing members at their seating planes; and these will be first described. These wearing plates, M and $M^1$, are constructed for centering the two housing members upon each other, the facing sides of said housing members being first formed for a like purpose with allowance for the interposition of the wearing plates, M and $M^1$. The facing surfaces of the housing members, and correspondingly the bearing plates, comprise a directly trans-axial portion at the margin of the housing cavity, succeeded by substantially cylindrical or circum-axial portion, in turn succeeded circumferentially there-about by another directly trans-axial portion, and terminated by an outer marginal portion of frusto-conical form so that the two wearing plates of washers are adapted to seat nested one within the other, as clearly seen in Figures 1, 4 and 5. Referring to the two wearing washers, M and $M^1$, the inner marginal trans-axial portion is engaged by the reference letter, $m$, and the next outer cylindrical portion by a reference letter, $m^1$, succeeding trans-axial portions by $m^2$, and the outer marginal flaring frusto-conical portion by $m^3$.

In the form shown in Figures 4 and 5 the bend between the several portions, corresponding to $m^1$, $m^2$, and $m^3$ and $m^4$, of Fig. 1, and which are denoted by corresponding exponents of reference letters, $n$ and $w$ are generally shown as rounded rather than angular, as for some reasons is preferable. In the form shown in Figure 4 the wearing washer, $n^1$, is dimensioned with respect to the washer, $n$, so that when the inter-transaxial portion and the outer flaring portions are seated, there is a slight space remaining between the cylindrical portions and also between the intermediate and transaxial portions (designated in this form by letters, $n^5$ and $n^6$. In the form shown in Figure 5 in which the curvilinear outline is more definitely accentuated, the two parts, W, $W^1$, corresponding to M and $M^1$, are respectively dimensioned so that when seated upon each other at the transaxial and outer bearing portions, crevices remain between the bends as seen at $w^5$ and $w^6$. These details of deviation of Figures 4 and 5 from Figure 1 are somewhat preferential because they tend to the admission of grease between the two wearing plates.

For engaging the wearing plates with the housing members respectively, each of the housing members is provided at some point in the margin of the housing cavity at the seating plane, with a notch into which a finger is struck or bent from the wearing washer, as seen at $a^1$, which is a notch in the margin of the cavity, $a$, of the member, A, engaged by a finger, $m^5$, struck back from the general plane of the inner marginal flange, $m^4$, of the washer or wearing plate, M, and as seen in the notch, $b$, formed in the margin of the cavity of the member, $b$, into which a finger, $m^6$, struck from the inner marginal portion, $m$, of the member, $M^1$, is folded. These notches and engaging fingers may be duplicated at opposite points of the housing cavity marginal portions, as indicated in Figure 1. It may be understood that a similar expedient may be employed when the forms of the plates are as shown in Figures 4 and 5.

For the bearing of the driving shaft, $d$, steel bushings, $D^5$ and $D^6$, are driven into the member B, at the inner and outer ends of the cavity therein, leaving between said bushings an interval shown at $b^7$. This interval is left for the purpose of admitting grease from the general cavity; and for the purpose of such admission there are formed in the member, B, grooves $b^8$, $b^8$, wide or deep mouthed at their opening into the main cavity of the housing, and tapering back to the space, $b^7$, into which they open, as seen clearly in Figure 2. For the driven shaft, $e$, there is provided a steel bearing member, H, driven fast into the housing member, A, and keyed therein by a pin, h. The shaft, e, is reduced in diameter intermediate its ends as shown at $e^1$, and the steel bearing member, H, has a channel, $H^1$, leading into the cavity left in the said bearing member by the reduction of diameter of the cavity, $E^1$, out of the general cavity of the housing, for the same purpose as the channel, b, above described with respect to the driving shaft, d. For taking the thrust and wear of the shaft, d, as above mentioned, there are provided on said shaft back of the pinion, d, intermediate the same and the bearing bushing, $D^5$, two steel washers, S and s, the former abutting against the inner end of said bearing bushing, and the latter against the hub or central part of the gear, D. The washer, S, is provided with two radially projecting fingers, $S^1$, and there are formed in the housing member, B, at corresponding points around the seat of the journal bearing bushing, $D^5$, recesses, $b^3$, in which these fingers, $S^1$, which are deflected from the plane of the washer are engaged when the washer is lodged in position, as shown; and thereby the washer, S, is held non-rotatable and the wear of rotation is imposed upon the inner side of said washer, S, and upon the two sides of the washer, s, which is free to rotate with the gear, D, or which may under some circumstances remain at rest upon the washer, S, while the gear rotates upon its opposite face. The wear of rotation is thus distributed between the meeting plane of the two washers, and the meeting plane of the washer, S, and the hub of the gear, D. At the opposite ends of the gear member, F, G, a like precaution is desirable, and there are provided between the gear, F, and the adjacent end of the housing member, B, on the journal bolt, C, two washers, P and p, the former adjacent to the housing wall and the latter adjacent to the hub of the gear, the washer being provided with lugs, $P^1$, which engage recesses, $a^3$, in the adjacent wall of the housing, as seen in Figure 11. At the opposite end of the gear member, G, between the same and the adjacent wall of the housing, there is provided a single washer and wearing plate, R, having radial lugs, $R^1$, which are deflected for engagement in recesses, $a^3$, in the adjacent wall of the housing, as seen in Figure 6. For the purpose of admitting grease to the journal bearing bolt, C, on which the unitary gears, F and G, rotate, said unitary member has between the gears, F and G, grease apertures, f, opening into the general grease cavity of the device.

V is a cover or closure cap which closes the grease cavity of the entire fitting, being for that purpose screwed onto the end of the housing member, B, opposite the inner end of the shaft, d. The housing member is extended at this portion to provide a considerable storage space for grease, as seen in Figure 2.

I claim:—

1. A swivel gear joint comprising two soft metal gear housing members, each adapted for housing a pair of intermeshing gears and for seating upon each other at a plane transverse to two corresponding gears on respective pairs, said corresponding gears being rigid with each other, a journal bearing bolt on which said rigid gears are journaled and which secures together said two housing members for their swiveling action upon each other at said transverse plane, and a pair of bearing washers of suitable hard metal for taking the wear of the swiveling action interposed between said two housing members, each of said washers having a finger struck out of the plane of contact of the two washers for engagement with the adjacent housing member for insuring against rotation as between the washers, and the housing members limiting the wear of swiveling to the hard metal washers.

2. A swivel gear joint comprising two soft metal gear housing members, each adapted for housing a pair of intermeshing gears and for seating upon each other at a plane transverse to two corresponding gears on respective pairs, said corresponding gears being rigid with each other, a journal bearing bolt on which said rigid gears are journaled and which secures together said two housing members for their swiveling action upon each other at said transverse plane, and a pair of bearing washers of suitable hard metal for taking the wear of the swiveling action interposed between said two housing members, said washers being annularly and concentrically corrugated for seating and centering upon each other.

3. A swivel gear joint comprising two soft metal gear housing members, each adapted for housing a pair of intermeshing gears and for seating upon each other at a plane transverse to two corresponding gears on respective pairs, said corresponding gears being rigid with each other, a journal bearing bolt on which said rigid gears are journaled and which secures together said two housing members for their swiveling action upon each other at said transverse plane, and a pair of bearing washers of suitable hard metal for taking the wear of the swiveling action interposed between said two housing members, said washers being annularly and concentrically corrugated for seating and centering upon each other, the corrugations having one wall substantially cylindrical and the opposite wall flaring or frusto-conical.

4. A swivel gear joint comprising two soft metal gear housing members, each adapted for housing a pair of intermeshing gears and for seating upon each other at a plane transverse to two corresponding gears on respective pairs, said corresponding gears being rigid with each other, a journal bearing bolt on which said rigid gears are journaled and which secures together said two housing members for their swiveling action upon each other at said transverse plane, and a pair of bearing washers of suitable hard metal for taking the wear of the swiveling action interposed between said two housing members, said washers being annularly and concentrically corrugated for seating and centering upon each other, the corrugations having one wall substantially cylindrical and the opposite wall flaring or frusto-conical, the flaring areas and the direct transaxial areas of the washers being related to each other for seating simultaneously, and the bends between the transaxial and the cylindrical areas on the one hand, and between the cylindrical and the flaring areas on the other hand being relatively shaped in the two washers for spacing the washers apart at said bends when the transverse and flaring areas are seated.

5. A swivel gear joint comprising two soft metal gear housing members, each adapted for housing a pair of intermeshing gears and for seating upon each other at a plane transverse to the axis of the two intermediate gears of the series, the inleading and outleading shafts having interposed at the ends of their journal bearings for taking the thrust of power-transmission, a plurality of hard metal washers, the washer adjacent to the journal bearing being provided with a finger engagement with said bearing to prevent its rotation thereon and limit the wear to the washers.

6. In a swivel gear joint comprising two gear housing members, each adapted for housing a pair of intermeshing gears, two pairs of gears being arranged in a continuous train of which the two intermediate gears are rigid with each other, said housing members being adapted for seating upon each other in a plane transverse to the axis of said rigid gears, a journal bearing bolt on which said rigid gears are journaled and which secures together the two housing members for their swiveling action upon each other, said bolt having at one end a head and being provided with a hard metal bushing for journaling and stopping it at that end and being threaded for screwing into the housing member at the other end, and means for making it fast against rotation at said screwed-in end.

7. A swivel gear joint comprising two soft metal gear housing members, each adapted for housing a pair of intermeshing gears, the four gears being arranged in a continuous train of which the two intermediate gears are rigid with each other, a pivot bolt securing the two housing members together and affording journal bearing for said rigid and intermediate gears, said housing members having their cavities communicating freely at the plane of their junction with each other; hard metal bushings for the inner and outer ends of the inleading and outleading shafts, the two bushings of each shaft being spaced apart longitudinally to provide an annular grease cavity between them around the shaft and the inner end of the bore in which said bushings are set being slotted longitudinally from the mouth of the bore back past the inner end of the inner bushing for opening the grease path to said annular grease cavity.

8. A swivel gear joint comprising two soft metal gear housing members, each adapted for housing a pair of intermeshing gears, the four gears being in continuous train, the two intermediate gears of the train being unitary and the housing members being adapted for seating upon each other in a plane transverse to the axis of said unitary gears, a journal bearing bolt which secures the two housing members together and affords a journal bearing for said unitary gear, said unitary gear having intermediate the two gear members thereof grease apertures leading to the journal bolt.

9. A swivel gear joint comprising two gear housing members, each adapted for housing a pair of intermeshing gears constituting a continuous train and adapted for seating upon each other at a plane transverse to the two intermediate gears of said train, the housing member having the outleading driven shaft of the train comprising two parts, one of which is a sleeve bearing for said outleading driven shaft, said sleeve having its exterior diameter at least as great as that of the gear on said outleading shaft whereby said outleading shaft with its gear mounted in said sleeve may be inserted bodily into the other part of said housing member, and means for keying said inserted sleeve in place therein.

In testimony whereof, I have hereunto set my hand at Chicago, Illinois, this 27 day of March, 1922.

JOHN K. OLSEN.